United States Patent [19]
Kruzick

[11] Patent Number: 5,823,733
[45] Date of Patent: Oct. 20, 1998

[54] VEHICLE MOUNTED HOIST WITH ADJUSTABLE CONTAINER SUPPORTING ROLLER ASSEMBLIES

[76] Inventor: Kent Kruzick, Rte. 4, Box 392, Hwy. 14 West, Winamac, Ind. 46996

[21] Appl. No.: 429,342

[22] Filed: Apr. 26, 1995

[51] Int. Cl.⁶ ........................................... B60P 1/28
[52] U.S. Cl. .......................... 414/498; 414/532; 414/535; 193/35 C; 193/35 R
[58] Field of Search ................... 414/498, 499, 414/500, 529, 530, 531, 532, 533, 534, 535, 536, 537, 539, 501, 480, 482, 469, 522, 542, 543; 193/42, 35 R, 37, 35 SS, 35 C, 34

[56] References Cited

U.S. PATENT DOCUMENTS

| | | | |
|---|---|---|---|
| 1,926,613 | 9/1933 | Yrarrazaval | 193/35 R |
| 3,239,081 | 3/1966 | Poleschule | 414/535 X |
| 3,606,059 | 9/1971 | Haberle, Jr. | 414/500 X |
| 3,897,882 | 8/1975 | Budoff | 414/500 |
| 4,456,418 | 6/1984 | Harter et al. | 193/35 C X |
| 5,183,371 | 2/1993 | O'Daniel | 414/498 X |

FOREIGN PATENT DOCUMENTS 3731220  3/1989  Germany .............................. 193/35 R

*Primary Examiner*—Frank E. Werner

[57] ABSTRACT

A vehicle mounted hoist includes container supporting roller assemblies configured to support a container for loading, unloading, transporting and/or dumping wherein the roller assemblies are vertically adjustable to provide for a variety of differently sized containers. The hoist includes a tilt frame and a plurality of brace devices mounted to the tilt frame and being for supporting a plurality of rollers in at least two different vertical positions, and includes a plurality of rollers sized and configured to be mounted to the brace devices to collectively support a container thereon.

14 Claims, 3 Drawing Sheets

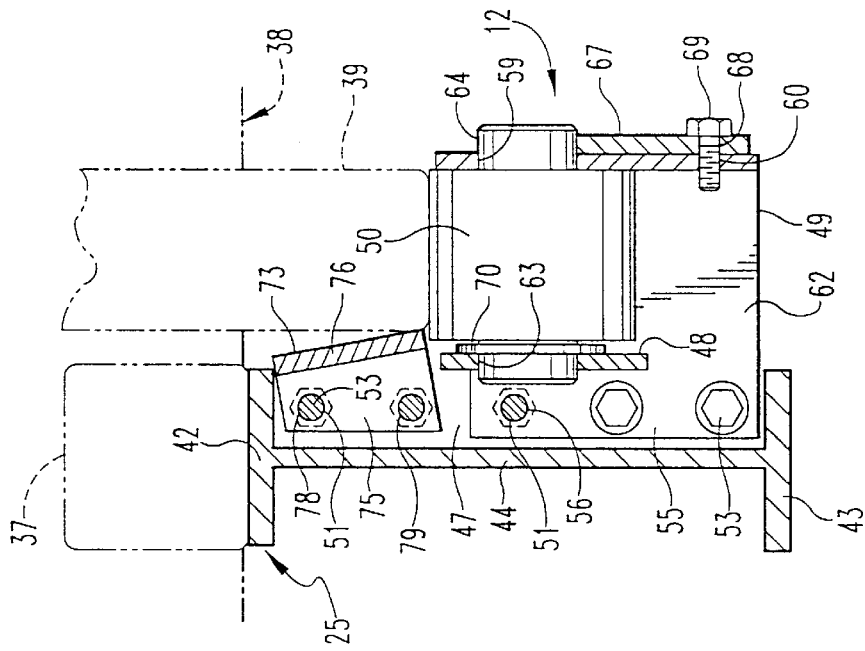
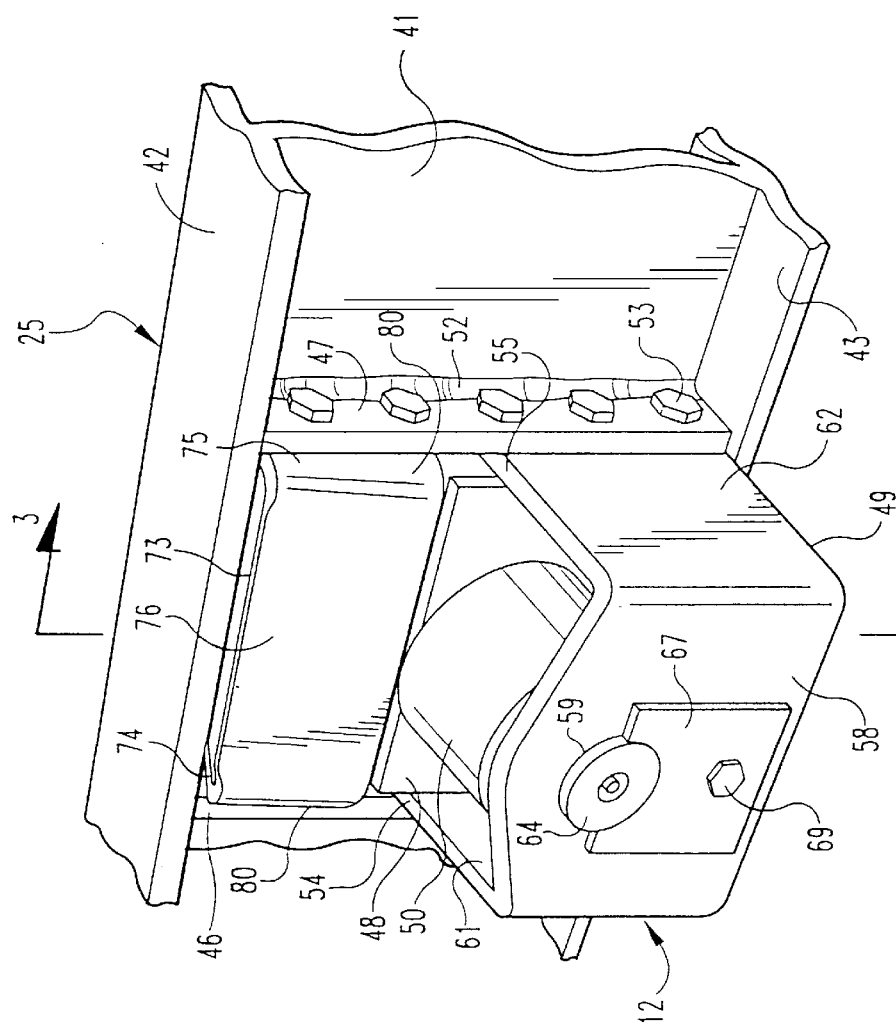

VEHICLE MOUNTED HOIST WITH ADJUSTABLE CONTAINER SUPPORTING ROLLER ASSEMBLIES

TECHNICAL FIELD OF THE INVENTION

The present invention relates to the field of vehicle mounted hoists for loading, transporting and unloading containers, and specifically to a vehicle mounted hoist having adjustable container supporting roller assemblies.

BACKGROUND OF THE INVENTION

In the field of transporting waste or bulk materials, it is not uncommon for containers to be manufactured in a wide variety of shapes and sizes. Consequently, vehicles or "hoists" for transporting these containers must be made in varying sizes and configurations to safely and efficiently load, transport, unload and/or dump these containers. One element common to many of these containers is a pair of elongate feet or "runners" that run the length of the bottom of the container and support the container as it sits on the ground. Vehicle mounted hoists designed to transport and/or dump the container will include components that are sized and configured to receive, engage and support the container by its runners. Because the height, width and spacing of runners may vary from container to container, each vehicle mounted hoist must be specifically outfitted with a mating set of runner supporting components. What is needed is an assembly that facilitates variation of the runner supporting components so that one vehicle mounted hoist design may be easily adapted to receive a variety of differently sized containers.

SUMMARY OF THE INVENTION

A vehicle mounted hoist includes container supporting roller assemblies configured to support a container for loading, unloading, transporting and/or dumping wherein the roller assemblies are vertically adjustable to provide for a variety of differently sized containers. The hoist includes a tilt frame and a plurality of brace means mounted to the tilt frame and being for supporting a plurality of rollers in at least two different vertical positions, and includes a plurality of rollers sized and configured to be mounted to the brace means to collectively support a container thereon.

Generally speaking there is provided a vehicle mounted hoist with container supporting roller assemblies configured to support a container for loading, unloading, transporting and/or dumping, wherein the roller assemblies are vertically adjustable to provide for a variety of differently sized containers. The hoist with adjustable roller assemblies includes a tilt frame and a plurality of brace means mounted to the tilt frame and being for supporting a plurality of rollers in at least two different vertical positions, and includes a plurality of rollers sized and configured to be mounted to the brace means to collectively support a container thereon.

It is an object of the present invention to provide an improved vehicle mounted hoist for loading, transporting, unloading and/or dumping a container.

It is a further object of the present invention to provide an improved hoist for loading, transporting, unloading and/or dumping a container wherein the rollers for supporting containers are vertically adjustable to accommodate a variety of differently sized containers.

Further objects and advantages of the present invention will become apparent from the following description of the preferred embodiment.

BRIEF DESCRIPTION OF THE DRAWINGS

FIG. 2 is a perspective view of an adjustable roller assembly 12 of the vehicle mounted hoist 10 of FIG. 1.

FIG. 3 is a cross sectional view of the adjustable roller assembly 12 of FIG. 2 taken along the lines 3—3 and viewed in the direction of the arrows.

DESCRIPTION OF THE PREFERRED EMBODIMENT

Figure 1:
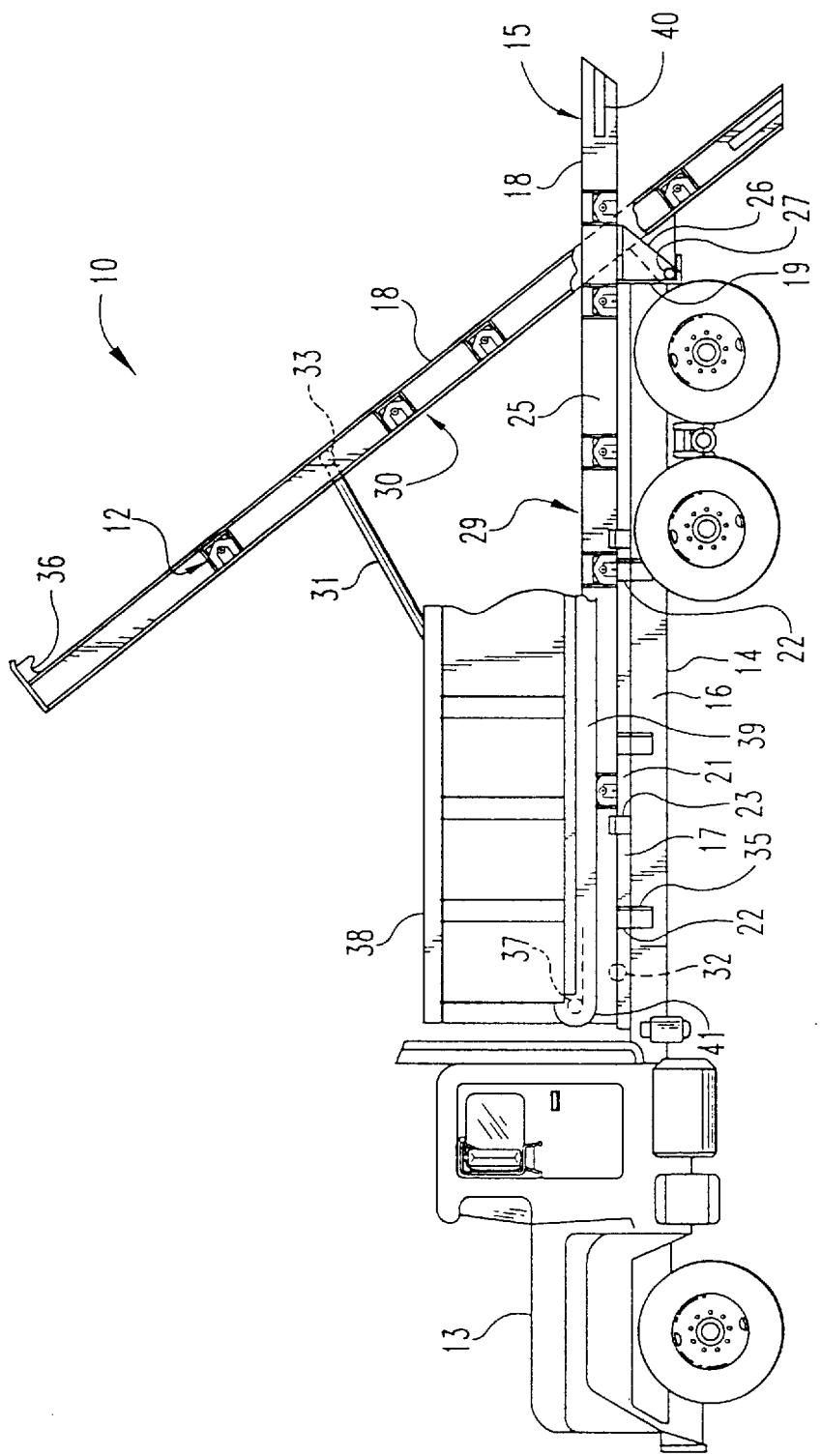
FIG. 1 is a side elevational view of a vehicle mounted hoist 10 with adjustable container supporting roller assemblies 12 in accordance with the preferred embodiment of the present invention, and showing tilt frame 18 in both a horizontal rest position (29) and in an inclined loading/unloading position (30).

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations or modifications in the illustrated device, and further applications of the principles of the invention as illustrated therein are herein contemplated as would normally occur to one skilled in the art to which the invention relates.

Referring to FIG. 1 there is shown a vehicle mounted hoist 10 with adjustable container supporting roller assemblies 12 in accordance with the preferred embodiment of the present invention. Hoist 10 generally includes a truck 13 with a mainframe 14 and a tilt assembly 15. As is standard with vehicles of this type, mainframe 14 comprises a pair of elongate, parallel beams, only the vehicle's left side beam 16 being shown in FIG. 1. For purposes of the present invention, the left and right sides of the present vehicle mounted hoist 10 are identical, and the following description will be directed to just one side, it being understood that such description applies equally to both sides of the hoist unless otherwise specified.

Tilt assembly 15 includes a subframe 17 and a tilt frame 18. As with mainframe 14, subframe 17 includes a pair of elongate, parallel beams, only the left side beam 21 being shown in FIG. 1. An L-shaped apron 19 is rigidly mounted to the rear of subframe 17, and a number of upper bracket members 22 are rigidly mounted in spaced apart relation along the outside of beam 21. Also rigidly mounted to the outside of beam 21 are one or more tilt frame guide members 23.

Like mainframe 14 and subframe 17, tilt frame 18 includes a pair of elongate, parallel beams, only the vehicle's left side beam 25 being shown in FIG. 1. A triangular hinge plate assembly 26 extends downwardly from tilt frame 18 at its rear, and tilt frame 18 is thereby hingedly mounted via one or more interconnecting hinge pins 27 to apron 19 of subframe 17. Tilt frame 18 is thereby enabled to pivot between a horizontal rest position lying atop subframe 17 (at 29) and an inclined, loading, unloading or dumping position (at 30). A pair of hydraulic cylinder assemblies 31 (one shown) extend from a pivotal mounting 32 on subframe 17 to a pivotal mounting 33 on tilt frame 18. Cylinder assemblies 31 are mounted to subframe 17 and tilt frame 18 at the insides of the pair of elongate, parallel beams 21 (one shown) and to the insides of the pair of elongate, parallel beams 25 (one shown). In this way, tilt frame 18 is fabricated as a unit and mounted as a unit atop the vehicle mainframe 14. Elongate beams 16 of mainframe 14 are provided with a number of lower bracket members 35 that are positioned to align and mate with the upper bracket members 22 so that, when tilt frame 18 is set atop mainframe 14, upper and lower bracket members 22 and 35, respectively, are then bolted or otherwise affixed together to securely hold tilt frame 18 to mainframe 14. Apron 19 is affixed to mainframe 14 as by welding. Tilt frame 18 further includes a front stop assembly 36 which engages with rollers 37 that are mounted to the front of a container 38. Tilt frame 18 also includes a pair of loading skids 40 (one shown) extending outwardly from the outsides of and at the rear of the pair of elongate tilt frame beams 25. As will be described herein, container 38 includes a pair of spaced apart runners 39 that extend the length of the bottom of container 38, the runners 39 being rounded at their fronts (at 41). Skids 40 are provided to initially guide container 38, at the rounded fronts 41 of runners 39, up onto tilt frame 18.

Referring now to FIGS. 1, 2 and 3, a plurality of adjustable roller assemblies 12 are mounted to the outsides of elongate tilt frame beams 25, as shown. For the present invention, beams 25 are I-beams having upper and lower plates 42 and 43, respectively, and a web 44 extending vertically therebetween. Each roller assembly 12 includes a pair of side braces 46 and 47, inside and outside axle supports 48 and 49, respectively, and a roller 50. Side braces 46 and 47 are rigidly connected to beam 25 by appropriate means such as welding 52. Braces 46 and 47 are sized and configured to fit within the recess of I-beam 25 (that is, the recess formed by upper and lower plates 42 and 43 and web 44) so that braces 46 and 47 do not extend outwardly of plates 42 and 43, as shown. Each of braces 46 and 47 are provided with a number of vertically spaced apart holes 51 through which may extend appropriate fasteners such as bolts 53. Outside axle support 49 is generally a U-shaped member comprising opposing, inwardly extending legs 61 and 62 and a central portion 58 extending therebetween. The inner ends 54 and 55 of legs 61 and 62 respectively, are provided with a number of holes 56 which align with the holes 51 of braces 46 and 47. The central portion 58 of outside axle support 49 is provided with an opening 59 sized to receive the axle 64 for roller 50 and is provided with an opening 60 therebelow, the purpose of which will be described herein. Inside axle support 48 generally comprises a rectangular plate that extends between and is rigidly connected as by welding to opposing legs 61 and 62 of outside axle support 49. Axle support 48 defines an opening 63 that is sized to receive axle 64 therein. A retainer 67 is rigidly connected as by welding to axle 64 and defines a lower mounting hole 68.

In assembly, roller 50 may be positioned as shown in FIGS. 2 and 3 between central portion 58 and inside axle support 48 while axle 64 is passed through opening 59 of central portion 58, through roller 50 and finally through opening 63 of inside axle support 48 until retainer 67 rests against the outside of central portion 58, as shown. Opening 68 of retainer 67 will then be in alignment with opening 60 of central portion 58, and a bolt and nut assembly 69 or other appropriate fastener may be extended through openings 60 and 68 to securely attach retainer 67 to outside axle support 48 which thus firmly holds axle 64 and roller 50 in place. A thrust washer 70 is positioned as desired between inside axle support 48 and roller 50.

In use, with tilt frame pivoted to the inclined position 30, a cable winch assembly (not shown), as is known in the art, is connected to the front end of a container 38 to be loaded and the container is drawn up onto tilt frame 18. Initially, rollers 37 will engage and ride atop the upper plates 42 of beams 25, and the rounded fronts 41 of runners 39 will engage and ride up loading skids 40. Thereafter, rollers 37 will continue to ride atop the top of beams 25, and container 38 will mostly be supported atop tilt frame 18 by runners 39 which will rest atop rollers 50. As with mainframe 14 and the other components of hoist 10, only the left side runner 39 is shown in FIGS. 1 and 3. The parallel runners 39 of container 38 are spaced laterally to straddle the outsides of beams 25 of tilt frame 18. The dimensions of the many containers used in the industry, and specifically their runners 39, often vary widely, and the hoists for loading and transporting such containers must usually be custom made to mate with these varying-sized containers. However, the adjustable roller assemblies 12 of the present invention may be adjustably mounted to account for a variety of different sized containers 38. In the embodiment presented herein, the axle support combination (48, 49) of roller assembly 12 may be positioned at any of three vertical heights. As shown in FIG. 3, axle support combination (48, 49) is bolted to side braces 46 and 47 using the bottom three holes 51 of braces 46 and 47. It may be raised to two different heights by using either the middle three of holes 51 or the upper three of holes 51. Other configurations are contemplated wherein the number and placement of holes 51 of side braces 46 and 47 and holes 56 of outer axle support 49 may vary.

Each of the adjustable roller assemblies 12 as shown in FIGS. 2 and 3 is also provided with a wearplate 73. Wearplate 73 is generally U-shaped with opposing, inwardly extending sidearms 74 and 75 and an interconnecting plate 76 extending therebetween. Each of sidearms 74 and 75 is provided with a pair of holes 78 and 79. Holes 78 and 79 are spaced apart so as to align with a pair of the holes 51 in each of side braces 46 and 47. Holes 78 and 79 are also positioned in their respective sidearms 74 and 75 so that upper hole 78 is closer to interconnecting plate 76 than is lower hole 79. In this manner, interconnecting plate 76 forms an angle with vertical, as shown in FIG. 3. In use with certain containers, with the parallel runners 39 being spaced a certain distance apart, the angled interconnected plate 76 helps to smoothly align container 38 as it is loaded atop tilt frame 18 and helps to remove any gap 77 that might otherwise exist between runners 39 and their corresponding tilt frame beams 25 so that container 38 will have little or no lateral movement as it rides atop tilt frame 18. The intersections of interconnecting plate 76 and its sidearms 74 and 75 are rounded at 80 which further helps smooth out and guide the movement of container 38 as it is loaded onto tilt frame 18.

Figure 5:
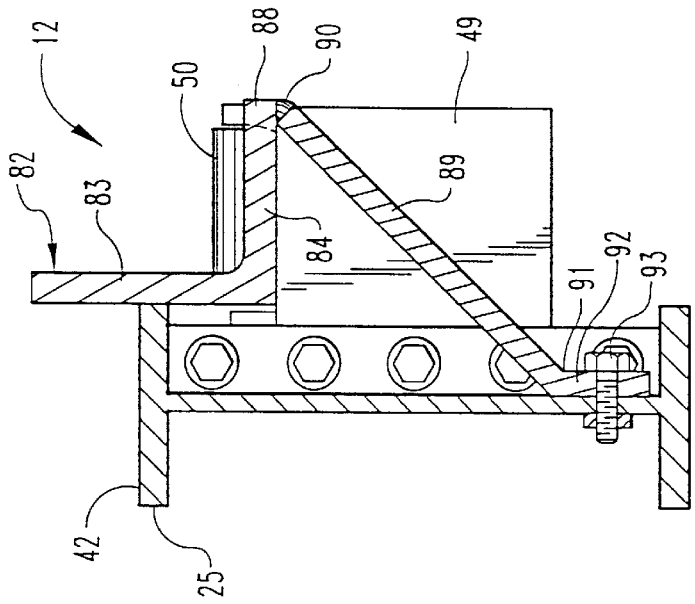
FIG. 5 is a cross sectional view of the adjustable roller assembly 12 of FIG. 4 taken along the lines 5—5 and viewed in the direction of the arrows.
Figure 4:
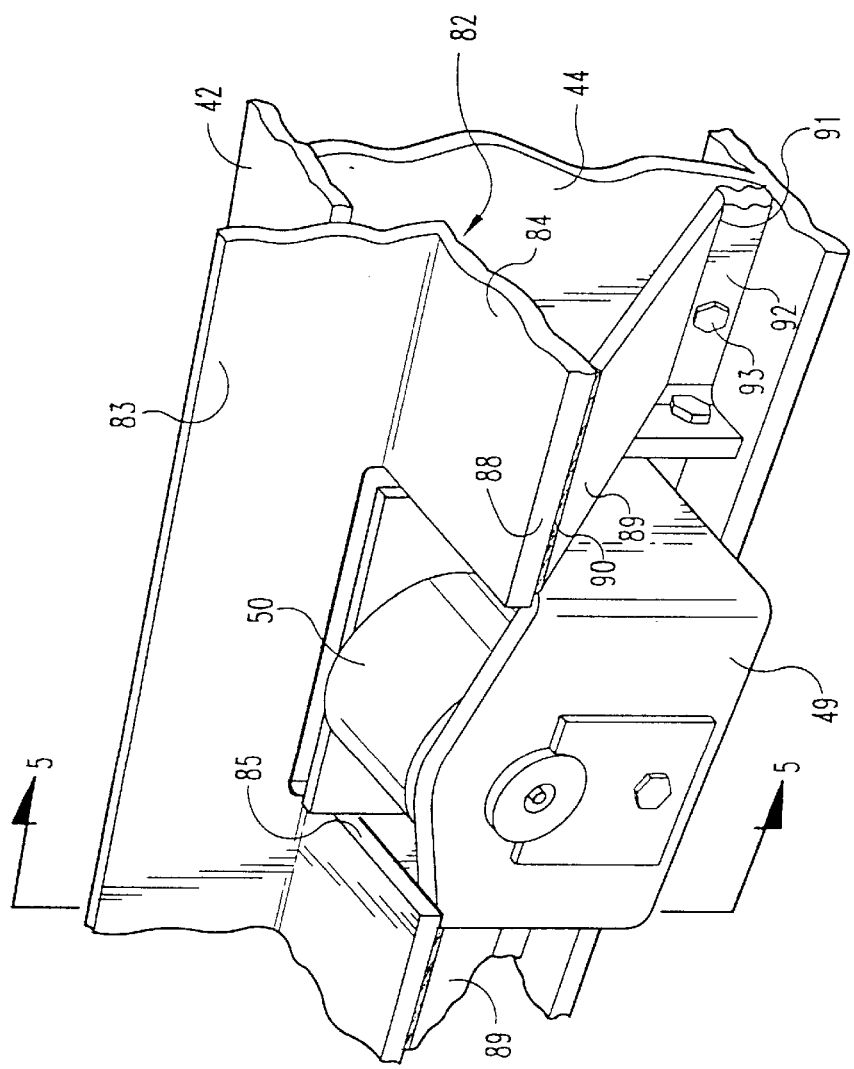
FIG. 4 is an additional embodiment of the adjustable roller assembly 12 of FIG. 2, assembly 12 being adjusted one step higher and including an elongate divider rail 82.

In the case of containers that are sized differently than that just described, as in the case of where runners 39 are closer together but still are sized to ride on the outside of tilt frame beams 25, wearplate 73 may be removed entirely. The present invention further contemplates yet additional sizes of containers. For example, where the heights of runners 72 warrant raising the axle support combination (48, 49) as shown in FIGS. 4 and 5, the top of roller 50 is not very far below the top of upper plate 42 of beam 25 and there is a danger that the container 38 may be jolted sufficiently during transport to jump up off of rollers 50. A divider rail 82 is thereby provided to add additional stability to container 38 when the rollers 50 are raised to a higher setting, as shown. Divider 82 runs a portion or all of the length of tilt frame 18 and has an L-shaped cross section comprising a vertical wall section 83 and a horizontally aligned base section 84. Cut-outs 85 are provided within base 84 and wall 83 as needed to expose rollers 50 above base 84 (or at the level of base 84, as desired) so that container rail 72 can ride atop rollers 50. The wall sections 83 are rigidly fixed to upper plates 42, as by welding. The horizontal base 84 may also be rigidly connected to outside axle supports 49 by welding, as desired. Support is provided at the outer edge 88 of horizontal base 84 by a series of angled brace plates 89 that are welded at 90 to edge 88 and extend from outer edge 88 downwardly and inwardly to web 44. Brace plates 89 then bend straight down at 91, forming a vertical mounting section 92 which is bolted at 93 to web 44, as shown. Divider rail 82 may also be applied in the event that the axle support combination (48, 49) is raised to the top setting (not shown) and may be secured to beam 25 in the same manner as described above. This configuration will enable a container (not shown) to ride atop tilt frame 18 where the runners 39 of the container are dimensioned to ride atop rollers 50 and to the outside of vertical walls 83, and may also accept a container (not shown) which has runners 39 which are dimensioned to fit between the vertical walls 83 of divider rails 82. In this configuration, runners 39 would ride atop upper plates 42 of beams 25. It would be desirable in this instance for divider rails 82 to be mounted with axle support combinations (48, 49) mounted to their uppermost position, thereby raising vertical rails 83 high enough to insure good lateral stability to a container during transport.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a vehicle mounted container hoist having a mainframe, a tilt frame pivotally connected to the mainframe and comprising a pair of I-beams each defining a recess, means for tilting the tilt frame relative to the mainframe, and an assembly for moving one of a group of containers having runners of varying heights onto and off of the tilt frame, all for loading, transporting, dumping and/or unloading the container, adjustable roller assemblies for supporting the container, comprising:

a plurality of brace means mounted to and within the recesses of the I-beams of the tilt frame and being for supporting a plurality of rollers, wherein each of said brace means includes a pair of braces rigidly mounted to and within the recess of one of said I-beams;

a plurality of rollers sized and configured to be mounted to said brace means to collectively support the container thereon;

roller support means for rotatably holding said rollers, said roller support means configured for vertically adjustable mounting positionment to said brace means; and wherein each of said plurality of brace means is sized and configured to hold a corresponding one of said plurality of rollers in at least two vertical positions to collectively support one of the group of containers with runners of varying heights upon its runners.

2. The adjustable roller assemblies of claim 1 wherein the tilt frame has opposing left and right sides and the recesses of said I-beams open outwardly to the left and right sides, and wherein there are at least two roller assemblies on each side of the tilt frame.

3. The adjustable roller assemblies of claim 2 wherein there are five roller assemblies spaced apart along each side of the tilt frame.

4. The adjustable roller assemblies of claim 1 wherein each pair of braces includes a plurality of spaced apart holes and wherein said roller support means includes a plurality of axle supports, each axle support configured to support an axle upon which is rotatably mounted a roller, each axle support further including a plurality of holes that are sized and configured to align with at least two of said plurality of spaced apart holes of a corresponding pair of said braces.

5. The adjustable roller assemblies of claim 4 further including a plurality of wear plates each sized and configured to mount to one of said pair of braces upwardly of said rollers.

6. The adjustable roller assemblies of claim 4 wherein each I-beam includes an upper and a lower plate and a web extending vertically therebetween and wherein said adjustable roller assembly further includes at least two divider rails mounted to said tilt frame, each of said divider rails having a generally L-shaped cross-section with a vertical divider wall and a horizontal base section, the divider wall being juxtaposed outside of the upper plate of said I-beam and the base section being juxtaposed atop of said axle support.

7. The adjustable roller assemblies of claim 6 wherein the base sections of said divider rails define cut-out areas that are positioned to permit said rollers to extend upwardly therethrough to permit a container to rest upon said rollers.

8. A vehicle mounted hoist for loading unloading, transporting and/or dumping containers with runners of varying heights, comprising:

a vehicle having a mainframe with a rear, a tilt frame hingedly mounted to the rear of the mainframe to pivot between a horizontal rest position and an inclined position, means for tilting the tilt frame relative to the mainframe, and an assembly mounted to the tilt frame and connectable with one of the containers for moving said one of the containers onto and off of the tilt frame, and wherein said tilt frame comprises a pair of I-beams each having a length and each defining a recess along its length;

a plurality of roller assemblies mounted to said tilt frame, each of said plurality of roller assemblies having a roller and having brace means mounted to said tilt frame, each brace means being sized and configured to support one of said rollers in at least two different vertical positions, each of said brace means being mounted to the I-beams within their recesses, and the rollers of said roller assemblies being able to collectively support said one of the containers at at least two different heights for transport;

roller support means for rotatably holding said rollers, said roller support means being configured for vertically adjustable mounting positionment to said brace means; and, wherein each of said brace means includes a pair of braces rigidly mounted to and within the recess of one of said I-beams.

9. The vehicle mounted hoist of claim 8 wherein said tilt frame has opposing left and right sides and the recesses of said I-beams open outwardly to the left and right sides, and wherein there are at least two roller assemblies on each side of said tilt frame.

10. The vehicle mounted hoist of claim 9 wherein there are five roller assemblies spaced apart along each side of said tilt frame.

11. The vehicle mounted hoist of claim 8 wherein each pair of braces includes a plurality of spaced apart holes and wherein said roller support means includes a plurality of axle supports, each axle support configured to support an axle upon which is rotatably mounted a roller, each axle support further including a plurality of holes that are sized and configured to align with at least two of said plurality of spaced apart holes of a corresponding pair of said braces.

12. The vehicle mounted hoist of claim 11 further including a plurality of wear plates each sized and configured to mount to one of said pair of braces upwardly of said rollers.

13. The vehicle mounted hoist of claim 11 wherein each I-beam includes an upper and a lower plate and a web extending vertically therebetween and wherein said adjustable roller assemblies further include at least two divider rails mounted to said tilt frame, each of said divider rails having a generally L-shaped cross-section with a vertical divider wall and a horizontal base section, the divider wall being juxtaposed outside of the upper plate of said I-beam and the base section being juxtaposed atop of said axle support.

14. The vehicle mounted hoist of claim 13 wherein the base sections of said divider rails define cut-out areas that are positioned to permit said rollers to extend upwardly therethrough to permit a container to rest upon said rollers.

\* \* \* \* \*